D. Garrison.
Applying Gilding Preparations to Oval Frames.
N° 90,658. Patented Jun. 1, 1869.

Witnesses
Jno. D. Patten
Edmund Masson

Inventor
David Garrison,
By atty. A. B. Stoughton.

N. PETERS, PHOTO-LITHOGRAPHER, WASHINGTON, D.C.

United States Patent Office.

DAVID GARRISON, OF PHILADELPHIA, PENNSYLVANIA, ASSIGNOR TO HALL AND GARRISON, OF SAME PLACE.

*Letters Patent No. 90,658, dated June 1, 1869.*

---

IMPROVEMENT IN DEVICE FOR APPLYING GILDING-PREPARATIONS TO OVAL FRAMES.

---

The Schedule referred to in these Letters Patent and making part of the same.

---

*To all whom it may concern:*

Be it known that I, DAVID GARRISON, of the city of Philadelphia, and State of Pennsylvania, have invented certain new and useful improvements in the manner of making circular or oval "insides" for circular or oval frames; and that the following is a full, clear, and exact description of the same, reference being had to the accompanying drawings, making a part of this specification, in which—

Figures 3, 4, 5, 6, 7, and 8, show how insides have been heretofore made, and the difference between such and those I make.

The "insides" (so termed) in question, are made of pine or other wood, prepared, and gilded, for the purpose of relieving the sombre color of black walnut, which is much used for frames, and are placed in the rebates of the walnut frame. Being of very thin material, it has always been difficult to handle them, on account of their liability to break.

Figure 3:
Figure 4:

The plan heretofore pursued, in making these "insides," was first to cut or turn a number of them together, as shown in fig. 3; then to saw them apart, as shown in fig. 4. Afterward they were taken singly, and several coats of a suitable preparation applied to them by a brush, then bevelled, smoothed with pumice-stone, and finished with fine sand-paper.

When the preparation was so applied, the pieces would warp and twist, so that many were broken and destroyed in attempting to restore them to their natural, or original form, or shape.

By my mode of procedure, I avoid the difficulty and expense heretofore involved, and enamel or coat the insides, in parcels, in a machine, by which the operation is not only much expedited, but the work better done, while I avoid the liability of breakage by handling.

Figure 5:

A number of these "insides" is turned from a block or suitably prepared board, as shown at *a, a, a,* &c., in fig. 5, and are thence placed in an oval or circular ring, A, which is revolved on its edge, as shown in the drawings, by a gear-wheel, B, taking into the cogs on the outer perimeter of the frame A, said frame being held to the gear B by means of arms or braces C, which have pins, or studs *c* in them, that take into grooves *e* on the sides of said frame, and thus prevent it from leaving the gear.

On one of the arms C' there is placed a scraper, *b*, which is hinged at *d*, so as to swing it into position or out of place, to remove the block of "insides" when finished.

The edge of this scraper is so made as to fit into all the grooves 1 1 1 1 1 in the turned block, and so that said scraper may rest against the wood at the bottom of the grooves 2 therein, which, when the "insides" are separated, form the sides thereof.

The preparation is applied by a brush or otherwise, and the frame revolved, while the scraper may be held down hard against the wood by a lever or by the hand, and thus it removes all the surplus of the preparation, while it packs, smooths, and finishes that which will and does adhere to the wood, more perfectly than it is possible to do it by hand.

Figure 2:
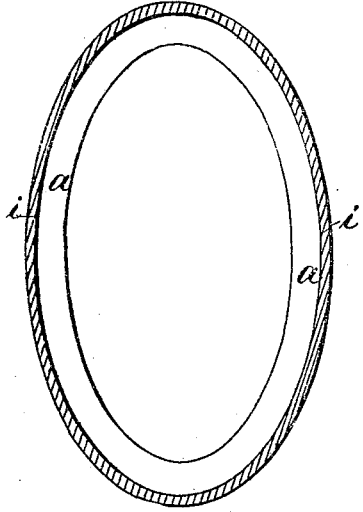
Figure 2 represents one of the oval insides as finished.

The operation can be continued and repeated until satisfactory, and both sides of the "inside," so made, being coated with the preparation, except the small space *i*, fig. 2, by which the block, or series of "insides" was held together, they do not warp, twist, or break, as when coated separately, as heretofore done.

Figure 6:

When the block, or series of "insides" is finished, it is taken out, and sawed apart, as shown at fig. 6, and cleared of the interposed block or bench between and ready for use.

Figure 7:
Figure 8:

Fig. 7 shows a block, of a different figure, or outline, and shown separated in fig. 8. These, however, are prepared in precisely the same way.

The ring, or frame and the series of "insides" may be oval, round, or parts of each—any form can be turned or revolved under a scraper that is held to it, to press, or work the preparation on to the wood, or frame.

Figure 1:
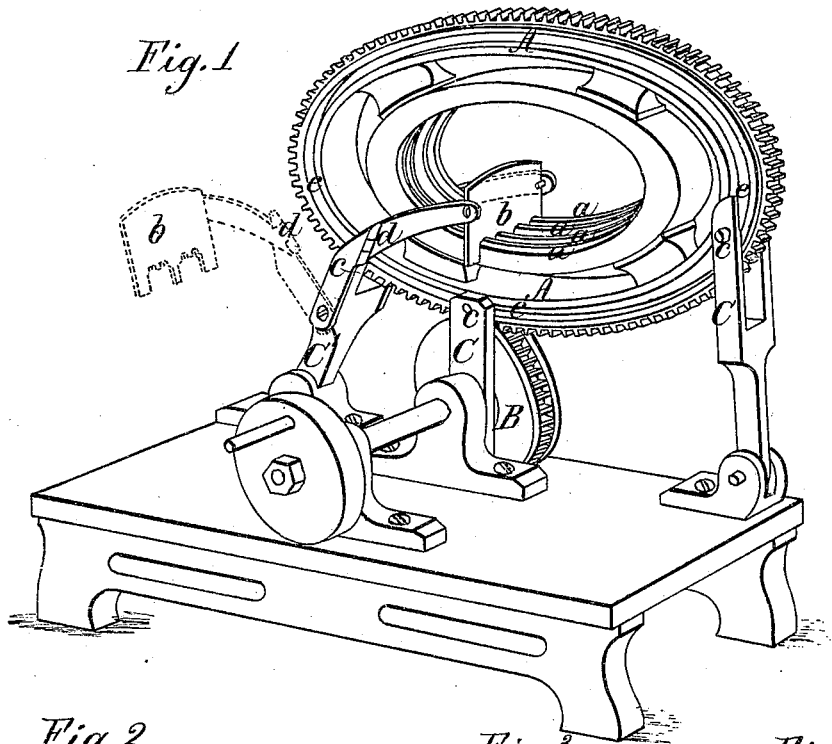
Figure 1 represents, in perspective, a machine, in which the insides for oval frames are prepared, and from which it will be obvious how circular insides can be made in the same way.

The red lines in fig. 1 show the scraper as swung out of its working-position, and also show the shape of its lower edge, which is of course the reverse of the section through the block, or series of "insides," and its interposed bench or wood, that holds it together.

The gilding of these "insides" not subjecting them to any strain or pressure in handling, as the putting on of the preparation does, very few, if any of them are broken, and they retain their shape and form far better than those prepared separately, as the block shown at figs. 3 and 4 could be, if even they were prepared by my machinery.

By my plan, the surfaces of the whole series are prepared by machinery, except the small portion of wood that unites them, and forms a bearing for the scraper, which bearing saves the "insides" from danger of breaking.

The small portion of the "insides" not covered by the material is concealed by the rebate of the frame in which these "insides" are used.

I have mentioned these "insides" as being used in connection with walnut frames only. It is obvious that they can be used with any dark wood or darkly-colored wood, as ebony, rosewood, or imitations thereof, and, instead of being placed in the rebate only, on the inner edge of the frame, they may be placed in a recess or recesses on or in any other part of the frame; and, when so used, the ornament may be placed on the piece so introduced, and thus added to the frame, which is much more convenient than putting the ornament on the frame itself, as it is less expensive.

Both of the sides of my improved "inside" are equally smooth, and uniformly prepared, while those made by hand were not so, though they were coated to prevent warping, twisting, and consequent danger of breaking.

Having thus fully described my invention, I would state that I am aware that ovals have been revolved on a face-plate. This I do not claim; but

What I do claim herein as new, and desire to secure by Letters Patent, is—

Preparing "insides" for frames by revolving them in an oval or circular holder, that is revolved upon its edge, and without the use of a face-plate, in combination with a scraper, operating substantially as described.

DAVID GARRISON.

Witnesses:
WILLIAM G. CROSS,
ALFRED S. BREARLEY.